United States Patent
Soltys et al.

(10) Patent No.: US 6,652,379 B2
(45) Date of Patent: Nov. 25, 2003

(54) METHOD, APPARATUS AND ARTICLE FOR VERIFYING CARD GAMES, SUCH AS BLACKJACK

(75) Inventors: Richard Soltys, Bellevue, WA (US); Richard Huizinga, Bellevue, WA (US)

(73) Assignee: MindPlay LLC, Bellevue, WA (US)

( * ) Notice: Subject to any disclaimer, the term of this patent is extended or adjusted under 35 U.S.C. 154(b) by 9 days.

(21) Appl. No.: 09/849,456

(22) Filed: May 4, 2001

(65) Prior Publication Data

US 2002/0086727 A1 Jul. 4, 2002

Related U.S. Application Data

(60) Provisional application No. 60/259,658, filed on Jan. 4, 2001.

(51) Int. Cl.[7] .................................................. A63F 13/00
(52) U.S. Cl. .............................. 463/22; 463/29; 463/12; 235/462.32; 235/462.35; 235/475; 235/483
(58) Field of Search .............................. 463/22, 29, 12; 235/462.01, 462.32, 462.35, 475, 483

(56) References Cited

U.S. PATENT DOCUMENTS

| | | | |
|---|---|---|---|
| 4,135,663 A | 1/1979 | Nojiri et al. | 235/463 |
| 4,531,187 A | 7/1985 | Uhland | 364/412 |
| 5,053,612 A * | 10/1991 | Pielemeier et al. | 235/454 |
| 5,110,134 A * | 5/1992 | Laughlin et al. | 273/148 R |
| 5,312,104 A * | 5/1994 | Miller | 273/148 R |
| 5,319,181 A | 6/1994 | Shellhammer et al. | 235/462 |
| 5,343,028 A | 8/1994 | Figarella et al. | 273/462 |
| 5,374,061 A * | 12/1994 | Albrecht | 273/149 R |
| 5,548,110 A | 8/1996 | Storch et al. | 235/472 |
| 5,586,936 A | 12/1996 | Bennett et al. | 463/25 |
| 5,605,334 A * | 2/1997 | McCrea, Jr. | 273/309 |
| 5,613,912 A | 3/1997 | Slater | 463/25 |
| 5,722,893 A | 3/1998 | Hill et al. | 463/47 |
| 5,735,525 A | 4/1998 | McCrea, Jr. | 273/309 |
| 5,735,742 A | 4/1998 | French | 463/25 |
| 5,770,533 A | 6/1998 | Franchi | 463/42 |
| 5,772,505 A * | 6/1998 | Garczynski et al. | 273/148 R |
| 5,779,546 A | 7/1998 | Meissner et al. | 463/25 |
| 5,780,831 A | 7/1998 | Seo et al. | 235/462 |
| 5,785,321 A | 7/1998 | van Putten et al. | 273/309 |
| 5,801,766 A | 9/1998 | Alden | 348/157 |
| 5,809,482 A | 9/1998 | Strisower | 705/30 |
| 5,909,876 A | 6/1999 | Brown | 273/309 |
| 5,911,626 A | 6/1999 | McCrea, Jr. | 463/27 |
| 5,919,090 A | 7/1999 | Mothwurf | 463/25 |
| 5,941,769 A | 8/1999 | Order | 463/12 |
| 5,945,654 A | 8/1999 | Huang | 235/449 |
| 6,039,650 A | 3/2000 | Hill | 463/47 |
| 6,126,166 A | 10/2000 | Lorson et al. | 273/148 R |
| 6,299,536 B1 | 10/2001 | Hill | 463/47 |
| 6,313,871 B1 | 11/2001 | Schubert | 348/143 |

OTHER PUBLICATIONS

Soltys, Richard et al., U.S. application No. 09/474,858, filed Dec. 30, 1999, entitled "Method and Apparatus for Monitoring Casinos and Gaming."

Soltys, Richard et al., U.S. application No. 09/790,480, filed Feb. 21, 2001, entitled "Method, Apparatus and Article for Evaluating Card Games, such as Blackjack."

* cited by examiner

*Primary Examiner*—Jessica Harrison
*Assistant Examiner*—Corbett B. Coburn
(74) *Attorney, Agent, or Firm*—Seed IP Law Group PLLC (57) ABSTRACT

A system reads an identifier from a hand of cards to identify the cards. For example, the system can read an identifier from a pair of cards forming the initial hand in blackjack, where the one card is face up and the other card is face down. The system determines the value of a hand of cards form the read identifiers. For example, the system can determine a value of an initial hand of two cards in blackjack, while only one card is face up. The system can inform a dealer of the value, or status based on value, of the hand. The system can determine whether cards forming a hand of cards are authenticate by validating the cards based on the read identifier. The system can determine if the cards forming the hand of cards are in an expected sequence based on a knowledge of the initial sequence of cards in a deck.

9 Claims, 11 Drawing Sheets

METHOD, APPARATUS AND ARTICLE FOR VERIFYING CARD GAMES, SUCH AS BLACKJACK

CROSS-REFERENCE TO RELATED APPLICATION

This application claims the benefit of U.S. Provisional Patent Application No. 60/259,658, filed Jan. 4, 2001, where this provisional application is incorporated herein by reference in its entirety.

TECHNICAL FIELD

This invention is generally related to gaming, and particularly to card games, such as blackjack.

BACKGROUND

Card games are a well-known form of recreation and entertainment. Games are typically played with one or more decks of cards, where each deck typically includes 52 cards. Each deck of cards will typically include four suits of cards, including: hearts, diamonds, clubs, and spades, each suit including fourteen cards having rank: 2–10, Jack, Queen, King and Ace. Card games may, or may not, include wagering based on the game's outcome.

One popular card game is known as blackjack. In blackjack, one or more players each compete against a dealer. The players attempt to collect a hand having a total value equal to, or as close to twenty-one, without going over. The value of the hand is determined by the rank of the card. Thus, cards having rank 2–10 have the value 2–10, respectively. Face cards (i.e., Jack, Queen, King) have the value 10, while Aces can have the value 1 or 10 at the player's discretion. An initial hand of two cards having the value of twenty-one (i.e., an ace plus a ten or a face card) is referred to as a natural "21", or blackjack, and beats other hands with the value of twenty-one. Suits have no bearing on the game of blackjack.

In blackjack, the dealer will initially deal two cards to each of the players and to the dealer, them self, in two passes around the table starting from the dealer's left (i.e., first base). The player's cards are dealt face up in games where the cards are dealt from a shoe, and face down in hand-held games (i.e., games dealt by hand). The rules of play for the dealer are strictly dictated, leaving no decisions up to the dealer. Therefore, there is not a problem with the dealer, or any of the other players at the table, seeing the cards in a player's hand.

The dealer turns one of the dealer's first two cards face up, such that the value of the card is visible to the players at the table. This card is commonly referred to as the "top" card. The dealer leaves the second card face down, such that the value of the card is not visible to the players at the table. The face down card is commonly referred to as the "hole" card. In some variations of blackjack, the dealer will immediately determine the value of the hole card, while in other variations of the game the dealer wait until all players have played their hands before checking the value of the hole card.

The dealer then offers each player in succession, from the dealer's left to right the opportunity to accept additional cards from the deck. Each player's hand is completed before the dealer offers the next player the opportunity to receive additional cards. Accepting cards is commonly referred to as "hitting" or taking a "hit." At each player's turn, the player may accept cards, one at a time, trying to build a hand with a value as close to twenty-one as possible, without going over twenty-one. The player may decline further cards at anytime, which is commonly referred to as "standing." The player must terminate play if the value of the player's hand exceeds twenty-one. A hand with a value exceeding twenty-one is commonly referred to as a "bust" or "busted." If the player busts, or has a natural twenty-one, the dealer must complete the player's hand and place that player's cards into a discard holder.

After each player in turn has declined to accept further cards, the dealer may accept further cards from the deck, with goal of obtaining a hand having a value as close to twenty-one as possible, without exceeding twenty-one. Casinos have rules based on the value of the dealer's hand that dictate when the dealer must take an additional card from the deck (i.e., hit) and when the player must decline further additional cards (i.e., stand). For example, many casinos require the dealer to stand if the dealer's hand has a value of seventeen or more. Some, casinos permit the dealer to take an additional card if the value of the dealer's hand is a soft seventeen, that is, if the value of the dealer's hand is seventeen by counting an Ace held by the dealer as eleven.

If the dealer busts, players who have not also busted win. If the dealer does not bust, all remaining players and the dealer must display their hands to allow the dealer compare each of the player's hands to the dealer's hand. Those players having a hand with a higher value than the dealer's hand, and who have not exceed twenty-one win. The winning players are paid based on the size of their wager and the odds. Blackjack includes additional rules such as "doubling down" "splitting" and "insurance" bets, and other variations that are commonly known by those who play blackjack, and will not be further described in the interest of brevity.

Blackjack is particularly popular in casinos and other gaming establishments. Players wager large sums of money while playing blackjack. Thus, it is important to ensure that those playing the game are not cheating. It is also important to monitor the game in a relatively unobtrusive manner to allow casino customers to feel comfortable in their surroundings.

SUMMARY

In one aspect, a system reads an identifier from a hand of cards to identify the cards. For example, the system can read an identifier from a pair of cards forming the initial hand in blackjack, where one card of the pair is face up and the other card is face down.

In another aspect, a system determines the value of a hand of cards. For example, the system can determine a value of an initial hand of two cards in blackjack, while only one card is face up. In another aspect, the system can inform a dealer of the value, or status based on value of the hand.

In a further aspect, a system can determine whether cards forming a hand of cards are authentic by validating the cards based on an identifier read from each of the cards forming the hand. In yet a further aspect, a system can determine if the cards forming a hand of cards are in an expected sequence based on a knowledge of the initial sequence of cards in a deck.

BRIEF DESCRIPTION OF DRAWINGS

In the drawings, identical reference numbers identify similar elements or acts. The size and relative positions of elements in the drawings are not necessarily drawn to scale. For example, the shapes of various elements are not drawn to scale, and some of these elements are arbitrarily enlarged and positioned to improve drawing legibility. Further, the particular shapes of elements, as drawn are not intended to convey any information regarding the actual shape of the particular elements, and have been solely selected for their ease and recognition in the drawings.

DETAILED DESCRIPTION

In the following description, certain specific details are set forth in order to provide a thorough understanding of various embodiments of the invention. However, one skilled in the art will understand that the invention may be practiced without these details. In other instances, well-known structures associated with cameras, optics, computers, computer networks, data structures, databases and networks such as the Internet, have not been described in detail to avoid unnecessarily obscuring the descriptions of the embodiments of the invention.

Unless the context requires otherwise, throughout the specification and claims which follow, the word "comprise" and variations thereof, such as "comprises" and "comprising" are to be construed in an open, inclusive sense, that is as "including but not limited to."

System Environment

Figure 1:
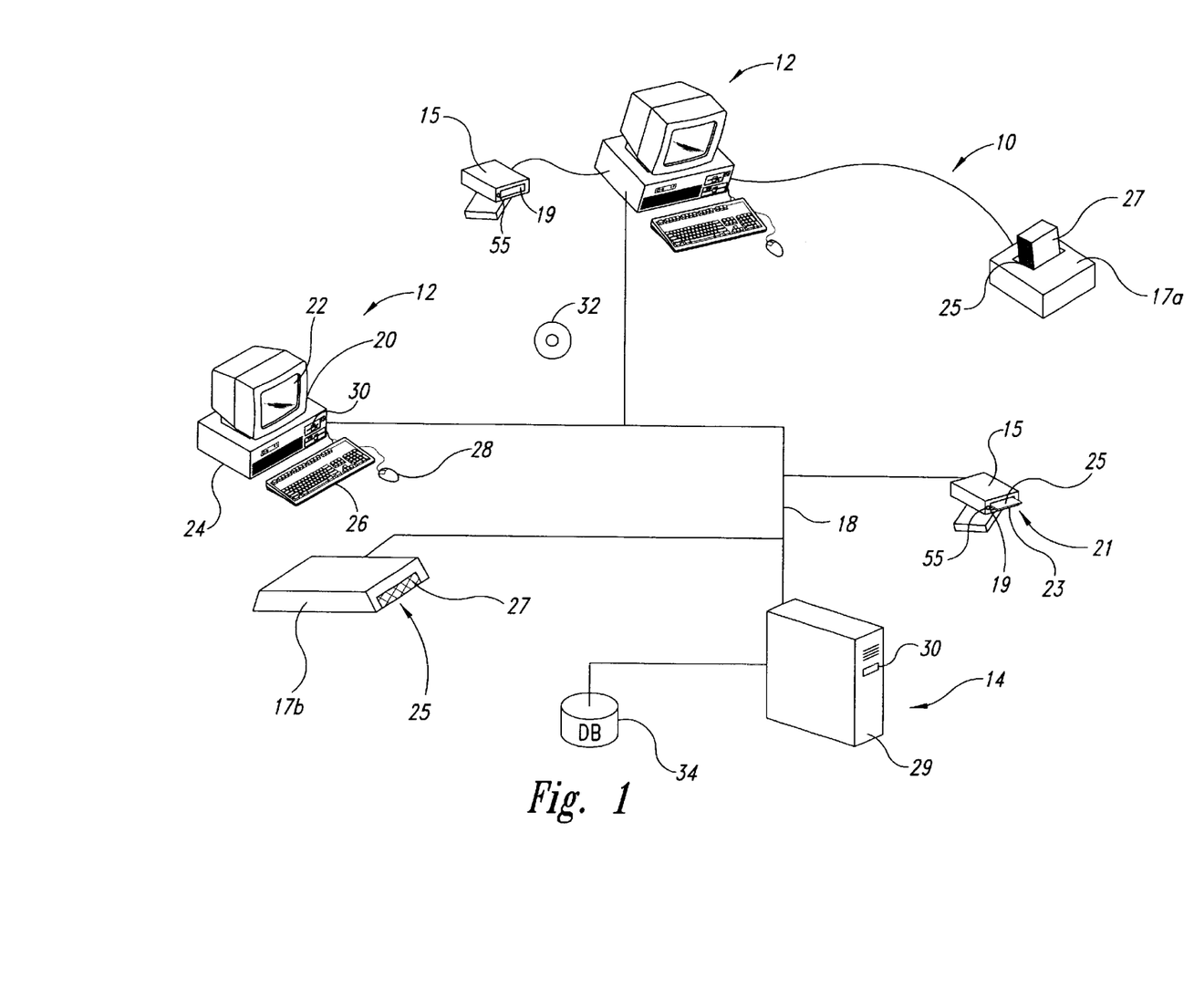
FIG. 1 is a schematic drawing showing an environment in which an embodiment of the invention can operate, including a network coupling a number of client computing systems, a server computing system, and a card hand reader.

FIG. 1 shows a card game validation system 10 including a number of client computing systems 12, a server computing system 14, a number of card hand readers 15, and a number of card deck readers 17A, 17B that communicate over a network 18. The card game validation system 10 and method of operation is illustrated in the environment of a blackjack game, although some components and methods are applicable to other types of card games.

The client computing systems 12 each include a display 20, screen 22, cabinet 24, keyboard 26 and mouse 28. The mouse 28 can have one or more user selectable buttons for interacting with a graphical user interface ("GUI") displayed on the screen 22. The cabinet 24 includes a slot 30 for receiving computer-readable media, such as a CD-ROM disk 32. Although the computer-readable media is represented as a CD-ROM disk 32, the card game validation system 10 can employ other computer-readable media, including but not limited to, floppy disks, tape, flash memory, system memory, and hard drives. The CD-ROM disk 32 can hold software applications discussed in detail below.

The server computing system 14 includes a cabinet 29 having a slot 30 for receiving computer-readable media, such as a CD-ROM disk similar to the CD-ROM disk 32. The server computing system 14 can optionally include a display, screen, keyboard, and/or mouse as described above. The server computing system 14 also includes a server database 34. The server database 34 is shown as being external to the cabinet 29 for ease of representation in the drawings, although in many embodiments the server database 34 can be located within the cabinet 29.

The card hand reader 15 has a slot 19 sized and dimensioned for receiving a hand of cards, such as the dealer's initial hand 21 which consists of the face up top card 23 and the face down hole card 25. As described in detail below, the card hand reader 15 is capable of reading an identifier associated with each of the cards 23, 25. The identifier can be encoded, for example, in a machine-readable symbol such as a bar code, or in a magnetic strip, carried on the card 23, 25. The identifier may take the form of a unique identifier, such as a serial number that uniquely identifies each card in the deck of cards, and/or the rank and/or suit of the cards 23, 25. As illustrated, the card hand reader 15 can be directly connected to one of the client computing systems 12, or can be coupled to a client computing system 12 via the network 18.

The card deck reader can take a hand-held form 17A for games dealt by hand, or can take a card shoe form 17B for games dealt from a card shoe. The hand-held card deck reader 17A includes a slot 25 sized and dimensioned to receive a deck of playing cards 27. The dealer can insert the deck 27 into the slot 25 prior to beginning a game. The shoe card deck reader 17B contains one or more decks of playing cards 27, and includes a slot 25 sized and dimensioned to allow the dealer to remove one card at a time. The card deck reader 17A, 17B is capable of reading a unique identifier such as a serial number, identifying each card in the deck of cards 27, and/or the rank and suit of the cards in the deck of cards 27. A similar reader is described in commonly assigned patent applications: Serial No. 60/130,368 filed Apr. 21, 1999 and Ser. No. 09/474,858 filed Dec. 30, 1999 and entitled "Method and Apparatus for Monitoring Casino Gaming." Thus, the sequence of the cards in the deck 27 is known to the card game validation system 10 at the start of the game. As illustrated, the card deck reader 17A, 17B can be directly connected to one of the client computing systems 12, or can be coupled to a client computing system 12 via the network 18.

The network 18 can take the form of any conventional network, such as one or more local area networks ("LANs"), wide area networks ("WANs"), and/or extranets, intranets, or the Internet.

Low-Level System

Figure 2:
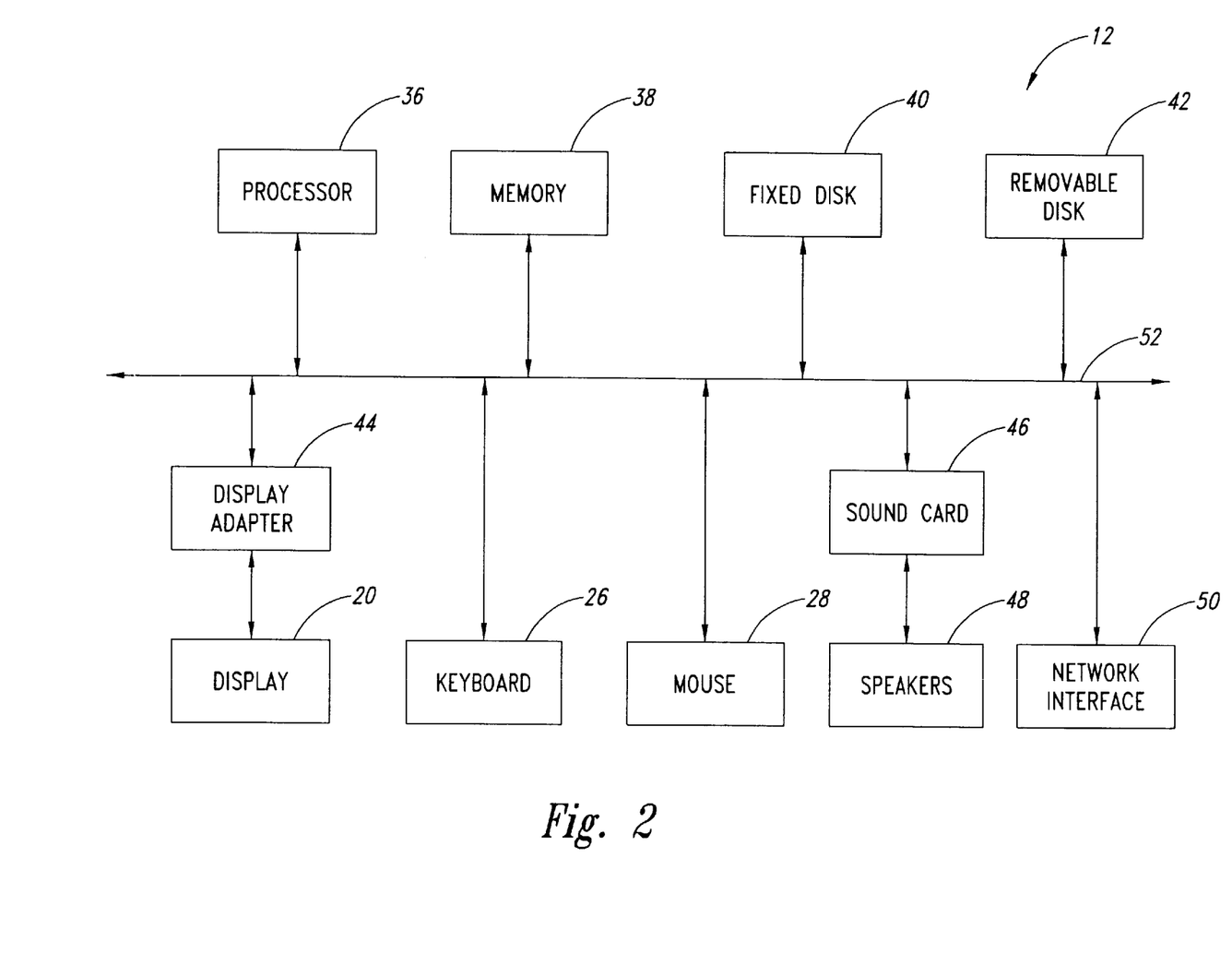
FIG. 2 is a high level system block diagram showing various hardware elements of the client computing systems of FIG. 1.

FIG. 2 shows a system block diagram of the client computing systems 12 used in executing an illustrated embodiment of the present invention. As in FIG. 1, the client computing systems 12 each include the display 20, keyboard 26 and mouse 28. Additionally, each of the client computing systems 12 can include subsystems, such as a processor 36, system memory 38, fixed persistent memory 40, media drive 42, display adapter 44, sound card 46, speakers 48, and network interface 50. Arrows 52 represent the system bus architecture of the client computing systems 12.

The client computing systems 12 can take any of a variety of forms, such as a micro- or personal computer, a mini-computer, a workstation, or a palm-top or hand-held computing appliance. The processor 36 can take the form of any suitable microprocessor, for example, a PENTIUM II, PENTIUM III, PENTIUM IV, POWER PC 603 or POWER PC 604 processor. The system memory 38 can take the form of random access memory ("RAM") or other dynamic storage that temporarily stores instructions and data for execution by the processor 36. The fixed persistent memory 40 can take the form of a hard drive or other nonvolatile computer-readable media. The media drive 42 can take the form of a CD-ROM reader, a DVD reader, an optical disk reader, floppy disk reader, or other similar device that reads instructions and/or data from computer-readable media.

While not shown in detail, the server computing system 14 can have a similar structure to the client computing systems 12, as shown in FIG. 2. In practice, the server computing system 14 will typically take the form of a network server, the details of which are commonly understood by those skilled in the art.

The computing systems 12, 14 are illustrative of the numerous computing systems suitable for use with the present invention. Other suitable configurations of computing systems will be readily apparent to one of ordinary skill in the art. Other configurations can include additional subsystems, or fewer subsystems, as is suitable for the particular application. For example, a suitable computing system 12, 14 can include more than one processor 36 (ie., a multiprocessor system) and/or a cache memory. The arrows 52 are illustrative of any interconnection scheme serving to link the subsystems. Other suitable interconnection schemes will be readily apparent to one skilled in the art. For example, a local bus could be utilized to connect the processor 36 to the system memory 38 and the display adapter 34.

Optical Card Hand Reader

Figure 3:
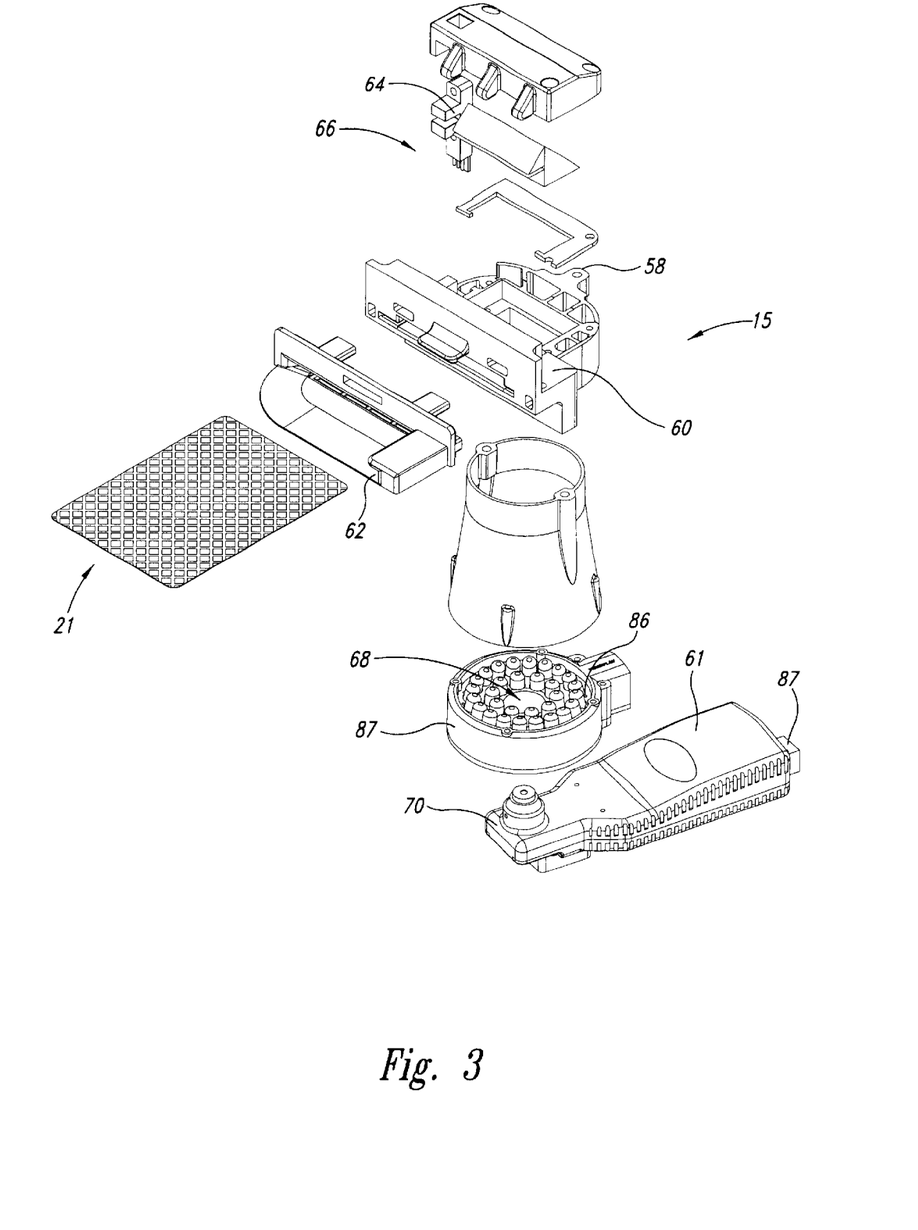
FIG. 3 is a perspective, partially exploded view of the card hand reader of FIG. 1.
Figure 4:
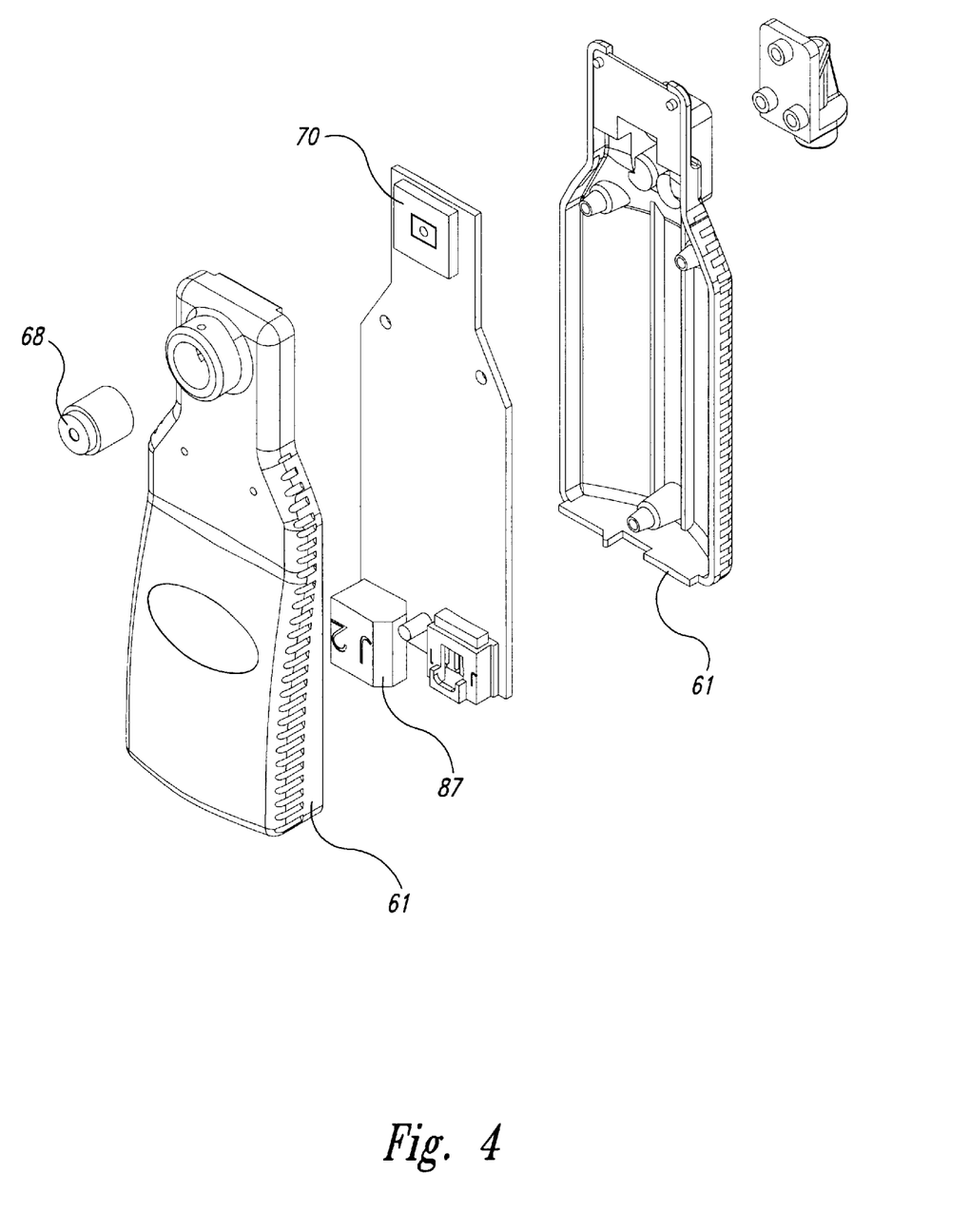
FIG. 4 is an exploded, perspective view of a portion of the card hand reader showing an optical lens assembly, imager and connector.
Figure 7:
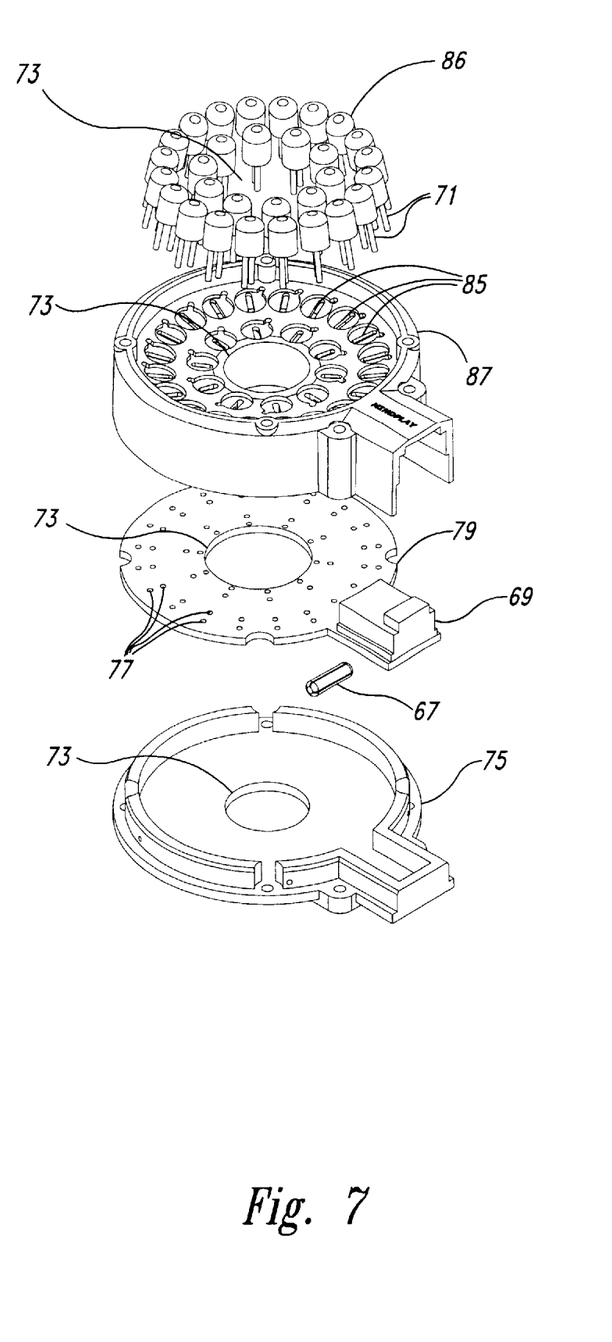
FIG. 7 is a an exploded perspective view of an illumination system for the card hand reader of FIG. 1.

FIGS. 3, 4 and 7 show the internal structure of the card hand reader 15. The card hand reader 15 reads An identifier, such as a machine-readable symbol, from the cards 23, 25. The machine-readable symbol can take any of a variety of forms, for example, a bar code symbol, or an area or matrix code symbol such as that disclosed in commonly assigned U.S. patent applications: Serial No. 60/130,368 and Ser. No. 09/474,858.

The machine-readable symbol can be printed on an end 54 of a face 56 of the cards 23, 25. The machine-readable symbol is preferably printed such that it is not visually perceptible to humans. For example, the machine-readable symbol can be printed in an ink that is visible only under a particular wavelength of light, such as ultraviolet. Alternatively, the machine-readable symbol can be incorporated into the design on the face 56 of the card, such that the symbol blends in with the design. In a further alternative, the machine-readable symbol can be printed in a magnetic ink. The identifier is preferably printed on a back face (i.e., face without rank or suit) of the cards 23, 25. The dealer can pick up the initial hand 21, with the hole card on top of the top card, such that the front faces (i.e., faces bearing the card's rank and suit) are adjacent one another. Thus, only the back faces of the cards 23, 25 are visible when the dealer places the dealer's hand into the card hand reader 15. This reduce the chance of one of the players seeing the rank of the dealer's hole card.

A frame 58 of the card hand reader 15 includes a card guide 60 having a slot 62 sized and dimensioned for receiving the hand of cards 21. The card guide 60 ensures that the cards 23, 25 in the initial hand 21 are properly positioned with respect to a set of optical components, described below.

An optical switch 64 detects the presence of the cards when the cards are properly positioned to be imaged. The optical switch 64 can take the form of a light source, such as a light emitting diode ("LED"), and a light sensor opposed to the light source across the slot 62 in the card guide 60. The insertion of the cards 23, 25 between the light source and light sensor interrupts the reception of light by the light sensor, that acts as the switch. The hand card reader 15 can alternatively employ other switching devices, such as mechanical switches, for detecting when the cards 23, 25 are properly positioned for imaging.

The optics include a prism assembly 66, an optical lens assembly 68, and an imager 70 aligned along an optical axis. The optical lens 68 assembly can include one or more optical lenses. A 9.9 FL lens assembly available from Sunex Inc., Carlsbad, Calif., part number DSL900C, can serve as a suitable optical lens assembly 68. The imager 70 includes photo-sensitive elements, such as charged-coupled devices ("CCDs") and suitable electronics for producing a digital representation of a captured image. A CMOS color sensor, such as the CMOS color sensor available from Photobit Corporation, Pasadena, Calif., part number PB300, can serve as a suitable imager 70. The card hand reader 15 can include additional optical components, such as reflectors, defractors, splitters, polarizers, filters and lenses, where such would be suitable to the particular application. The optical axis is defined by the optical properties and position of the optical components, and is not necessarily a straight path. Many of the components can be housed in an arm 61, formed from a pair of molded plastic halves.

Figure 5:
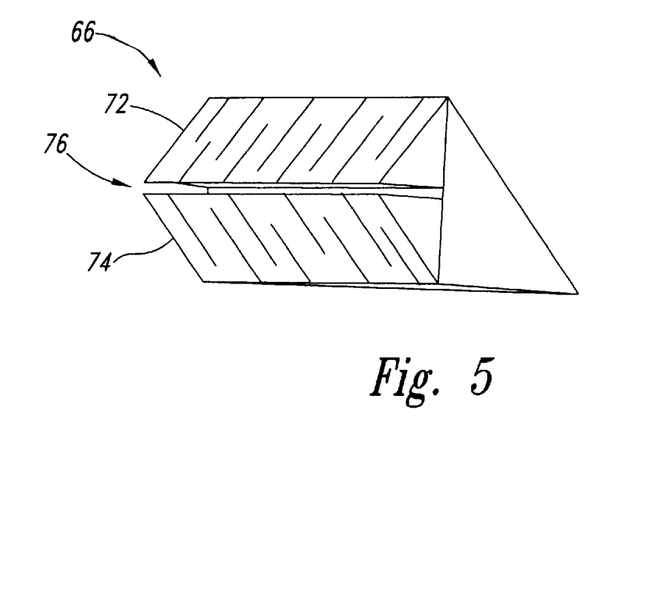
FIG. 5 is a perspective view of a prism assembly for use in the card hand reader of FIG. 3.
Figure 6:
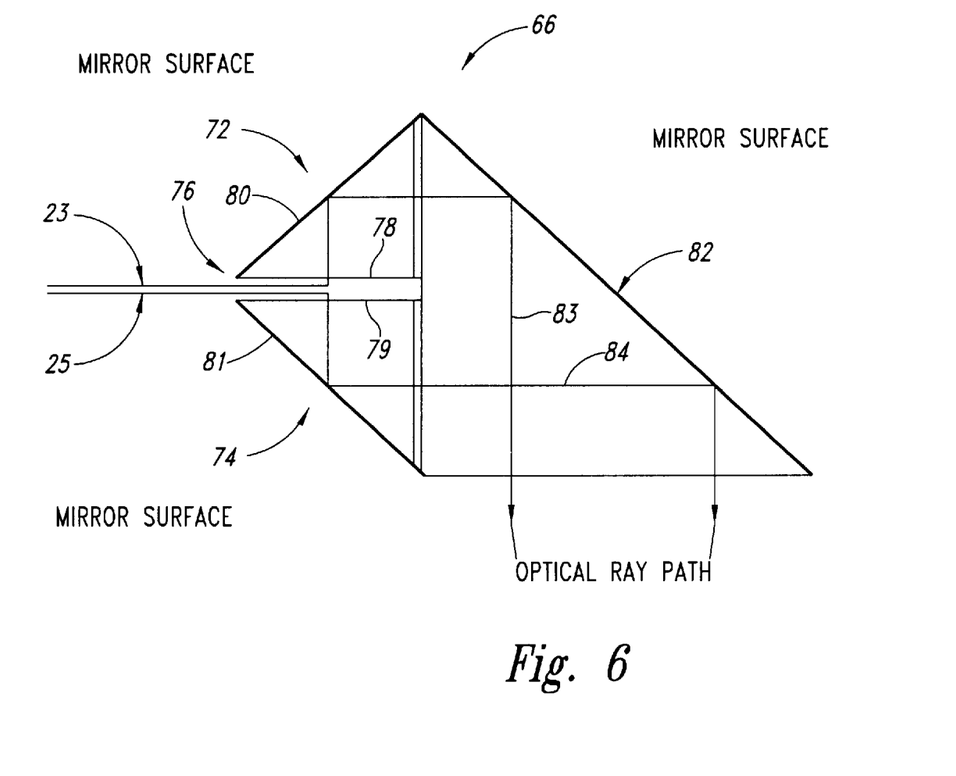
FIG. 6 is side elevation schematic view of the geometry of the prism assembly and optical path within the prism assembly.

FIGS. 5 and 6 more clearly illustrate the prism assembly 66. The prism assembly 66 includes top and bottom right angle reflecting prism portions 72, 74, respectively. A space or prism slot 76 is defined between adjacent legs 78, 79 of the top and bottom prism portions 72, 74, dimensioned to receive the cards 23, 25. The hypotenuse 80, 81 of each prism portion 72, 74, respectively, is a mirrored surface. A reflector 82 having a mirrored surface is approximately parallel to the hypotenuse 81 of the bottom prism portion 74, and perpendicular to the hypotenuse 80 of the top prism portion 72.

The optical path of the image of the top card 23 is illustrated by broken line arrow 83 (FIG. 7), while the optical path of the image of the bottom card 25 is illustrated by the broken line arrow 84 (FIG. 7). In each case, the image reflects from the hypotenuse 80, 81 of the respective prism portion 72, 74 onto the mirror surface of the reflector 82, which directs the image toward the optical lens assembly 68 and imager 70 (FIG. 3). The geometry of the optical system ensures that the image from each of the cards 23, 25 is properly focused on the imager 70 via the top and bottom prism portions 72, 74 (FIG. 3).

FIGS. 3 and 7 show the illumination system for the card hand reader 15. The card hand reader 15 includes one or more illumination sources 86 that provide low intensity illumination for the cards. The illumination sources 86 can take the form of one or more LEDs. Suitable LEDs can include ultraviolet ("UV") LEDs available from Nichia Corporation of Japan, part number NSHU590E. The illumination sources 86 are located in a base 87 of the card hand reader 15. The base 87 includes a sloped inner portion having a number of apertures 85 for receiving and aligning the illumination sources 86 to focus on the prism portions 72, 74. A printed circuit board 79 has openings 77 to receive leads 71 of the illumination sources 86. The printed circuit board 79 includes a connector 69, such as a three pin 5V connector for providing power to the illumination sources 86. A suitable connector 68 is available from Molex Electronics, Ltd. of Canada, part number 15-91-2045. The printed circuit board 79 also includes a resistor 67, for example a 3.6 Ohm resistor.

The base 87 is mounted to a bottom 75 that allows the frame 58 (FIG. 3) to rotate about an axis with respect to the arm 61 (FIG. 3). Each of the base 87, printed circuit board 79 and bottom 75, as well as the group of illumination sources 86 has a central opening 73 for providing an unobstructed optical path between the prism portions 72, 74 and the imager 70. The illumination sources 86 produce light suitable to the particular embodiment. For example, the card hand reader 15 employs illumination sources 86 that produce predominately UV where the machine-readable symbols are only visible under UV illumination.

The card hand reader 15 is coupled to the network 18 or host computer 12 by way of a connector 87, such as a FIREWIRE connector or Universal Serial Bus ("USB") connector. For example, a FIREWIRE connector available from Molex Electronics, Ltd. of Canada, part number 52462-0611, can serve as a suitable connector 87. The connector 87 can deliver the digital representation of the captured image to the appropriate client computing system 12 for image processing and card validation.

Magnetic Card Hand Reader

Figure 8:
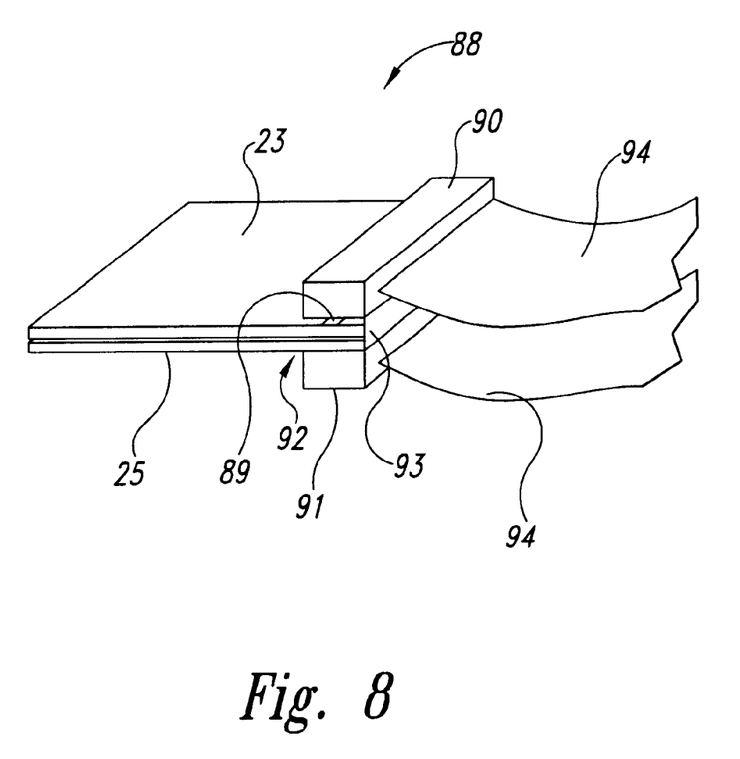
FIG. 8 is a partial perspective view of a magnetic reading head for an alternative embodiment of the card hand reader of FIG. 1.

FIG. 8 shows a magnetic head assembly 88 for use with an alternative embodiment of the card hand reader 15. The magnetic head assembly 88 is particular useful for cards marked with a magnetic strip 89. The magnetic head assembly 88 includes a pair of opposed magnetic heads 90, 91. The magnetic heads 90, 91 are spaced from one another to provide a slot 92 dimensioned to closely receive the cards 23, 25. A stop 93 engages the end of the cards such that the magnetic strip 89 on the cards 23, 25 are in registration with the magnetic heads 90, 91. Cables 94 couple each of the magnetic heads 90, 91 to suitable electronics (not shown) or the connector 87 (FIG. 3) for transmitting the read magnetically encoded identification information to the network 18 (FIG. 1).

Software

Figure 9:
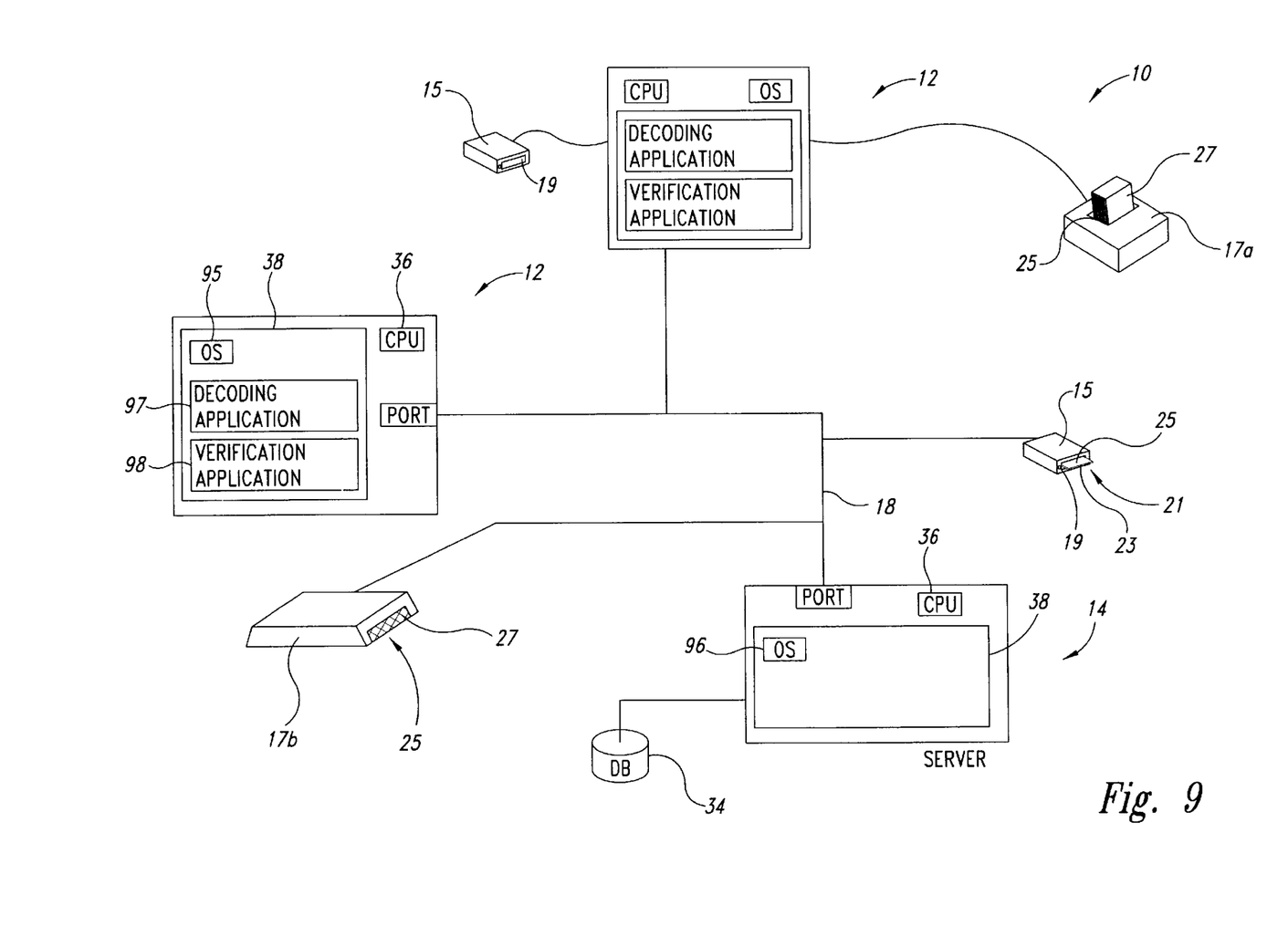
FIG. 9 is a schematic drawing showing the environment of FIG. 1, including a number of software applications loaded into memory on the client and server computing systems.

As shown in FIG. 9, the system memory 38 of the client computing system 12 and server computing system 14 contain instructions and data for execution by the respective processors 36 for implementing the illustrated embodiments. For example, the system memory 38 includes an operating system ("OS") 95, 96 to provide instructions and data for operating the respective computing systems 12, 14. In the case of the client computing systems 12 the OS 95 can take the form of conventional operating systems, such as WINDOWS 95, WINDOWS 98, WINDOWS NT 4.0 and/or WINDOWS 2000, available from Microsoft Corporation of Redmond, Wash. In the case of the server computing system 14, the OS 96 can take the form of conventional server operating systems, such as WINDOWS NT 4.0 Server, and/or WINDOWS 2000 Server, also available from Microsoft Corporation. The OS 95, 96 can include application programming interfaces ("APIs") (not shown) for interfacing with the various subsystems and peripheral components of the computing systems 12, 14, as is conventional in the art. For example, the OS 95, 96 can include APIs for interfacing with a display subsystem 20, 44, keyboard 26, sound subsystem 46, 48 and communications or network subsystem 50.

The system memory 38 of the client and server computing systems 12, 14 can also include additional communications or networking software (not shown) for wired and/or wireless communications on networks, such as local area networks ("LANs"), wide area networks ("WANs"), or the Internet. For example, the client computing system 12 can include a Web client or browser for communicating across the World Wide Web portion of the Internet using standard protocol (e.g., Transportation Control Protocol/Internet Protocol ("TCP/IP"), User Datagram Protocol ("UDP")). A number of Web browsers are commercially available, such as NETSCAPE NAVIGATOR from America Online, and INTERNET EXPLORER available from Microsoft of Redmond, Wash. The server computing system 14 can include a Web server, such as any of the many commercially available Web server applications.

The system memory 38 of the client computing system 12 includes instructions and/or data in the form of a decoding application 97 for resolving the digital image into machine-readable symbols and converting the machine-readable symbols into their respective identifiers and/or ranks and suits. Software for resolving digital images into machine-readable symbols and converting the machine-readable symbols into identifiers is commonly known in the automatic data collection ("ADC") arts. The system can additional, or alternatively, include other software for reading and converting other types of identifiers, such a magnetic strips.

The system memory 38 of the client computing system 12 also includes instructions and/or data in the form of a verification application 98 for determining the value and/or status of the hand (e.g., blackjack or not). The verification application 98 also can authenticate the cards in the hand (i.e., determine that the cards belong to the deck being played), and validate the sequence of the cards comprising the hand with respect to a known sequence of cards for the deck (i.e., no cards missing or inserted).

Exemplary Methods of Operation

Figure 10:
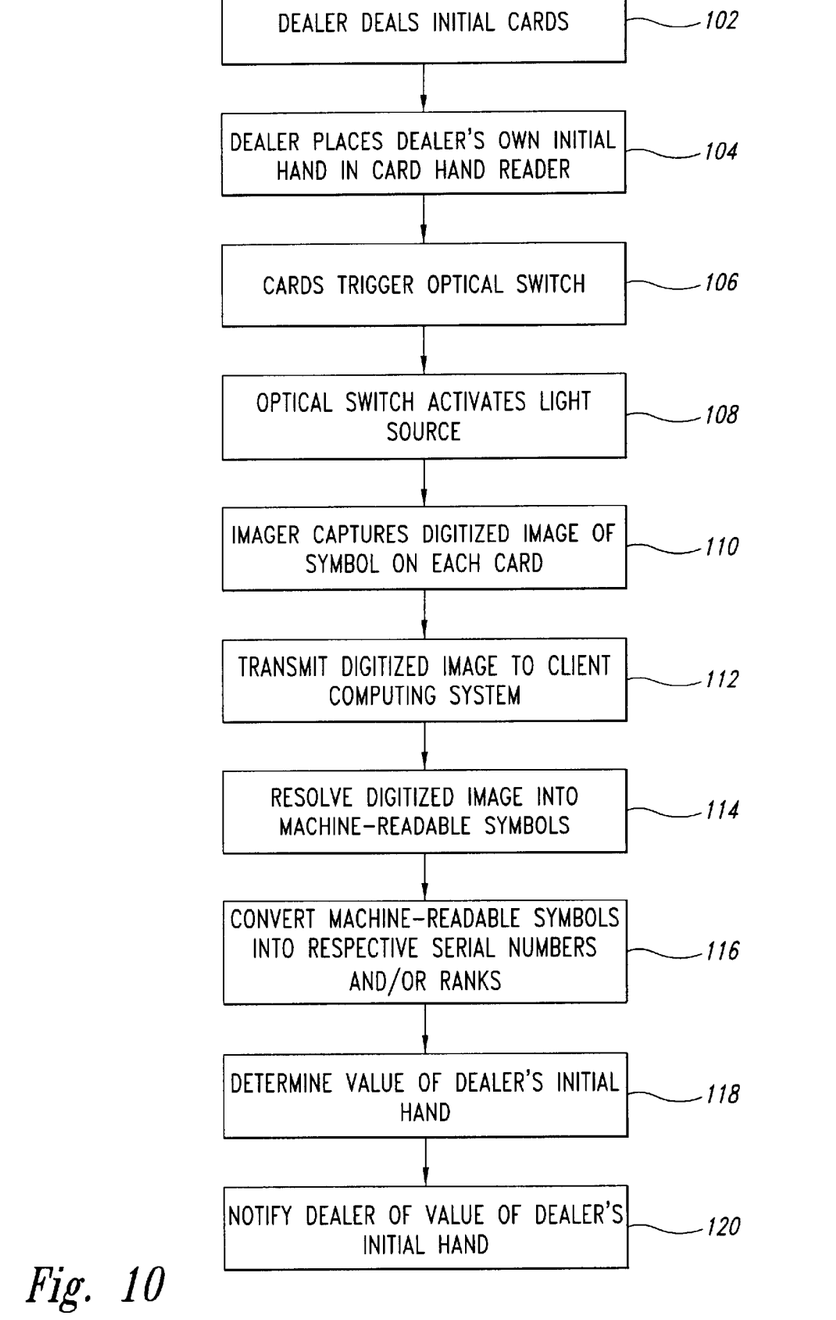
FIG. 10 is a flow diagram of an illustrated method of operation for the card game validation system of FIG. 1.
Figure 11A:
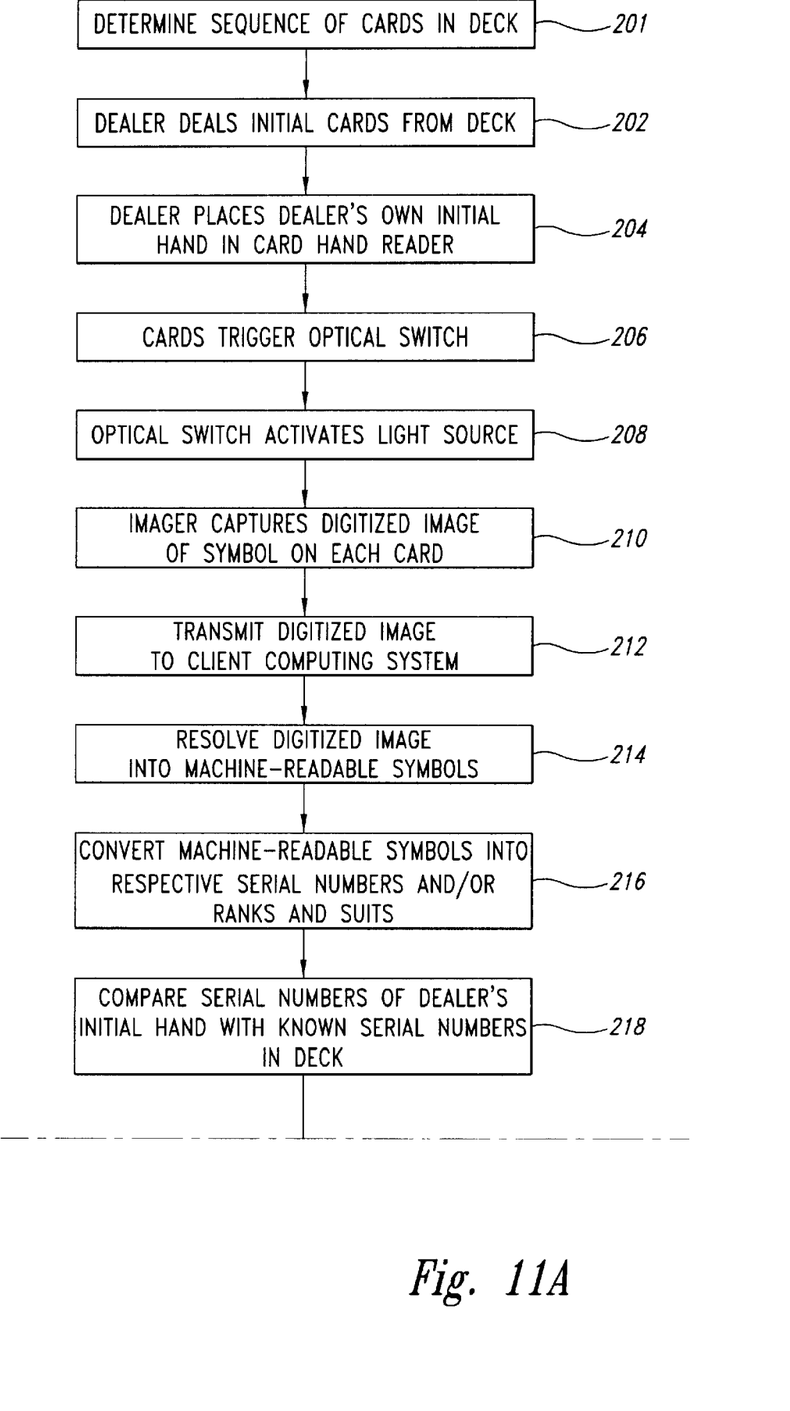
FIG. 11 is a flow diagram of another illustrated method of operation for the card game validation system of FIG. 1.
Figure 11B:
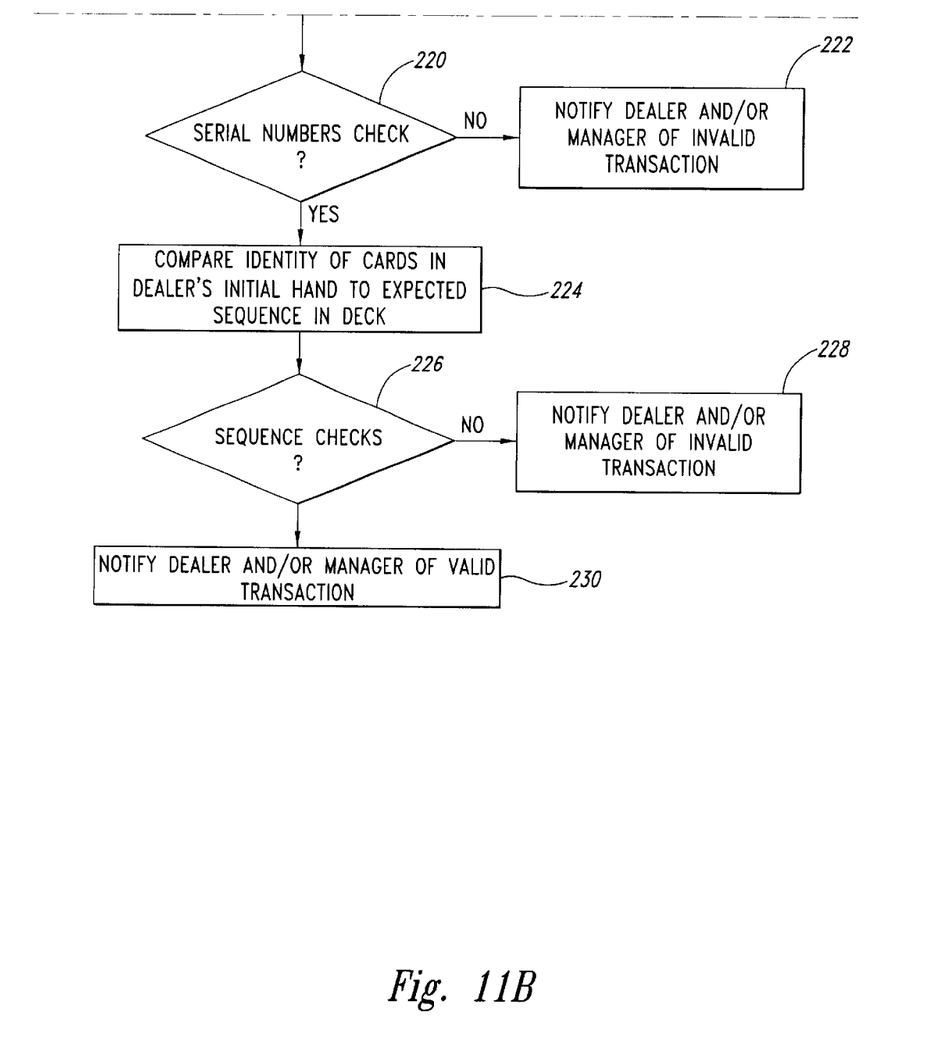

FIG. 10 shows an exemplary method 100 of operation for the card game validation system 10.

In step 102, the dealer deals the initial hand 21 (i.e., two cards, 23, 25) to each of the players and to the dealer, as generally described in the Background section. In step 104, the dealer places the dealer's own cards 23, 25 (e.g., initial hand) into the slot 25 in the card hand reader 17A, 17B. The back faces of the cards 23, 25 each face a respective one of the prism portions 72, 74.

In step 106, the insertion of the cards 23, 25 trigger the optical switch 64 when the cards 23, 25 are properly positioned within the card hand reader 15 to be imaged. In step 108, the optical switch 64 activates the illumination sources 86. The optical switch 64 can rapidly turn the illumination sources 86 ON and OFF, causing the imager 70 to capture a momentary image of the machine-readable symbols on the cards 23, 25. Alternatively, the illumination sources 86 may remain in the ON state, and the optical switch 64 can activate the imager 70 to capture the desired image.

In step 110, the imager 70 captures a digitized image of the respective machine-readable symbol on each of the cards 23, 25. In step 112, the card hand reader 15 transmits the digitized image to the client computing system 12, either directly or over the network 18.

In step 114, the client computing system 12 resolves the digitized image into machine-readable symbols. In step 116, the client computing system 12 converts the machine-readable symbols into respective serial numbers, and/or rank. Since the method is only directed to determining the value of the dealer's hand 21, the card's 23, 25 suits do not need to be determined.

In step 118, the client computing system 12 determines the value of the dealer's initial hand 21. The value can be determined based on the serial number that uniquely identifies each card 23, 25, for example by way of a lookup table or database search of data in the database 34 or other database (not shown) associated with one of the client computing systems 12. For example, the serial numbers for each deck 27 can be maintained in a central database 34, associated with the server computing system 14, or with the client computing system 12. Alternatively, the value of the cards 27 can be directly encoded into the machine-readable symbols carried by each card. The client computing system 12 can total the values of the two cards 23, 25 to determine the value of the dealer's initial hand 21. Knowledge of the value of the dealer's initial hand 21 can effect the play of the game. For example, the dealer may be able to immediately pay players having blackjack if it is known that the dealer's hand 21 is not also a blackjack. The dealer may also be able to offer the player's the opportunity to surrender.

In step 120, the client computing system 12 notifies the dealer of the value of the dealer's initial hand, and/or status of the dealer's initial hand such a blackjack or not blackjack. The notification can come via an indicator at the gaming table (not shown), for example a digital display such as an LCD touch screen, or a light 55 positioned on the card hand reader 15 or elsewhere on the gaming table. The visual display or light 55 is placed such that it is visible to the dealer, but not visible to the players.

FIG. 10 shows another exemplary method 200 of operation for the card game validation system 10.

In step 201, the deck reader 17A, 17B determines the sequence of cards in the deck 27.

In step 202, the dealer deals the initial hand 21 (i.e., two cards 23, 25) to each of the players and to the dealer, as generally described in the Background section. In step 204, the dealer places the dealer's own cards 23, 25 into the slot 19 in the card hand reader 15, such that an identifier on each of the cards 23, 25 is facing a respective one of the prism portions 72, 74.

In step 206, the insertion of the cards 23, 25 trigger the optical switch 64 when the cards 23, 25 are properly positioned with the card hand reader 15 to be imaged. In step 208, the optical switch 64 activates the illumination sources 86. As discussed above, the optical switch 64 operates the illumination sources 86 and/or the imager 70 to capture the desired image of the identifiers on the cards 23, 25.

In step 210, the imager 70 captures a digitized image of the respective machine-readable symbol on each of the cards 23, 25. In step 212, the card hand reader 15 transmits the digitized image to the client computing system 12, either directly or over the network 18.

In step 214, the client computing system 12 resolves the digitized image into machine-readable symbols. In step 216, the client computing system 12 converts the machine-readable symbols into respective serial numbers, and/or ranks and suits. Since the method 200 is directed to uniquely identifying the cards with respect to the entire deck, and not just the value of the dealer's hand, the rank and suit would need to be determined, if the client computing system 12 was not relying on the serial number.

In step 218, the client computing system 12 compares the serial number of the cards 23, 25 in the dealer's initial hand 21, with the known serial number of cards in the deck 27. If the serial number of the cards 23, 25 in the dealer's initial hand 21 do not match the serial number of cards in the deck 27, the client computing system 12 notifies the dealer and or a manager (e.g., pit boss) of the discrepancy in step 222, and may even terminate the game. The notification can come via an indicator at the gaming table, for example a digital display or a light 55. The visual display or light 55 is placed such that it is visible to the dealer, but not visible to the players. If the serial number of the cards 23, 25 in the dealer's initial hand 21 does match the serial number of cards in the deck 27, the client computing system 12 passes control to step 224.

In step 224, the client computing system 12 compares the identity of the cards 23, 25 in the dealer's hand 21, with the expected sequence of cards in the deck 27. In a simple scenario, this takes the form of comparing the order of the top and bottom cards 23, 25 with the order in the deck 27, to ensure that the cards were dealt in the correct order. In more complicated analysis, a knowledge of the number of players, and/or hands dealt and the initial deck sequence allows the client computing system to ensure that the dealer's hand is composed of the correct cards.

If the identity of the cards 23, 25 in the dealer's hand 21 does not correspond with the expected sequence of cards in the deck 27, the client computing device 12 notifies the dealer and or a manager (e.g., pit boss) of the discrepancy in step 228, and may even terminate the game. The notification can again come via an indicator at the gaming table, for example a digital display or a light 55. If the identity of the cards 23, 25 in the dealer's hand 21 does correspond with the expected sequence of cards in the deck 27, the client computing device 12 can notify the dealer and/or manager, allowing the game to continue.

Summary

Although specific embodiments, and examples for, the invention are described herein for illustrative purposes, various equivalent modifications can be made without departing from the spirit and scope of the invention, as will be recognized by those skilled in the relevant art. The teachings provided herein of the invention can be applied to other systems for performing card verification, not necessarily the blackjack card verification system generally described above. For example, the teachings can employ other networks, such as the World Wide Web portion of the Internet. The various embodiments described above can be combined to provide further embodiments. For example, the illustrated methods can be combined, or performed successively. The illustrated methods can omit some acts, can add other acts, and can execute the acts in a different other than that illustrated to achieve the advantages of the invention. The teachings of the applications and patents referred to herein, are incorporated by reference in their entirety.

These and other changes can be made to the invention in light of the above detailed description. In general, in the following claims, the terms used should not be construed to limit the invention to the specific embodiments disclosed in the specification, but should be construed to include all computers, networks and card reading and validation systems that operate in accordance with the claims. Accordingly, the invention is not limited by the disclosure, but instead its scope is to be determined entirely by the following claims.

What is claimed is:

1. A system to read card hands, comprising:
a card guide forming a card slot sized and dimensioned to receive an initial hand of playing cards including at least two playing cards;
a reader positioned with respect to the card slot to simultaneously acquire a respective optically encoded identifier from each of at least two playing cards in the initial hand; and
a decoder coupled to receive and decode signals from the reader corresponding to the acquired identifiers, wherein the reader comprises:

a prism assembly including a first prism portion and a second prism portion, the second prism portion having a side parallel to a side of the first prism portion and spaced therefrom by a distance sufficient to receive the initial hand of playing cards therebetween; and an imager disposed along an optical path from the first and the second prism portions.

2. A method of reading an initial hand of at least two playing cards, comprising:

illuminating the initial hand of at least two playing cards;

directing an image of an optically encoded identification bearing portion of a first one of the playing cards along an optical path to an imager;

simultaneously directing an image of an optically encoded identification bearing portion of a second one of the playing cards along an optical path to the imager; and electronically capturing the image of the identification bearing portions of the first and the second ones of the playing cards.

3. The method of claim 2, further comprising:

resolving the captured image into machine-readable symbols for each of the first and the second ones of the playing cards; and converting the machine readable symbols into serial numbers corresponding to each of the first and the second ones of the playing cards.

4. The method of claim 2, further comprising:

resolving the captured image into machine-readable symbols for each of the first and the second ones of the playing cards; and converting the machine readable symbols into ranks corresponding to a rank of each of the first and the second ones of the playing cards.

5. The method of claim 2, further comprising:

resolving the captured image into machine-readable symbols for each of the first and the second ones of the playing cards; and converting the machine readable symbols into ranks and suits corresponding to a rank and a suit of each of the first and the second ones of the playing cards.

6. The method of claim 2, further comprising:

producing a notification of a value of the playing cards.

7. The method of claim 2, further comprising:

verifying that the identifiers from the playing cards in the initial hand match identifiers of playing cards in a playing card deck from which a playing card game is being dealt.

8. A method of identifying playing cards, comprising:

simultaneously electronically capturing an optical image of an optically encoded identifier bearing portion of each of at least two playing cards;

resolving the captured image of at least a portion of each of the at least two playing cards into respective machine-readable symbols;

decoding the respective machine-readable symbols into respective serial numbers for each of the at least two playing cards; and determining a respective card rank corresponding to each of the serial numbers.

9. A computer-readable media carrying instructions for causing an imager to read an initial hand of playing cards, by:

causing the imager to simultaneously electronically capture in a single image an optically encoded identifier portion of at least a first and second card in the initial hand of playing cards;

resolving said single image into respective machine-readable symbols for each of the first and the second playing cards;

converting the machine readable symbols into respective serial numbers corresponding to each of the first and the second playing cards; and converting the serial numbers into respective ranks corresponding to each of the first and the second playing cards.

\* \* \* \* \*